United States Patent [19]
Ippolito et al.

[11] Patent Number: 6,072,522
[45] Date of Patent: Jun. 6, 2000

[54] VIDEO CONFERENCING APPARATUS FOR GROUP VIDEO CONFERENCING

[75] Inventors: Peter M. Ippolito; Caroline M. Cook, both of Austin, Tex.

[73] Assignee: CGC Designs, Austin, Tex.

[21] Appl. No.: 08/868,798

[22] Filed: Jun. 4, 1997

[51] Int. Cl.$^7$ ...................................................... H04N 7/14
[52] U.S. Cl. ........................... 348/15; 348/16; 379/93.21
[58] Field of Search ................................... 348/15, 16, 20, 348/169

[56] References Cited

U.S. PATENT DOCUMENTS

| | | |
|---|---|---|
| 3,958,084 | 5/1976 | Nicholas . |
| 4,054,908 | 10/1977 | Poirier et al. . |
| 4,267,593 | 5/1981 | Regan et al. . |
| 4,449,238 | 5/1984 | Lee et al. . |
| 5,003,532 | 3/1991 | Ashida et al. . |
| 5,117,285 | 5/1992 | Nelson et al. . |
| 5,206,721 | 4/1993 | Ashida et al. ............................ 348/15 |
| 5,347,306 | 9/1994 | Nitta . |
| 5,473,367 | 12/1995 | Bales et al. . |
| 5,479,203 | 12/1995 | Kawai et al. . |

FOREIGN PATENT DOCUMENTS 407264569  10/1995  Japan ................................ H04N 7/14

*Primary Examiner*—Huyen Le
*Assistant Examiner*—Melur Ramakrishnaiah

[57] ABSTRACT

A group video conferencing apparatus for the purposes of facilitating a video conference involving a group of participants which are azymuthly located about said apparatus is described. Means are are provided for the identification of a principle speaker and for the positioning of the video camera so as to capture the image of the principle speaker. Identification of the azymuthal orientation of the principle speaker is realized through the electronic processing of audio signals generated by the group of participants, and the azymuthal positioning of the video camera is adjusted through electro-mechanical means so as to capture the image of the identified principle speaker.

12 Claims, 11 Drawing Sheets

VIDEO CONFERENCING APPARATUS FOR GROUP VIDEO CONFERENCING

CROSS-REFERENCES TO RELATED APPLICATIONS

U.S. Pat. No. 3,958,084 May 1976 Nicholas
U.S. Pat. No. 4,054,908 October 1977 Poirier et al.
U.S. Pat. No. 4,267,593 May 1981 Regan et al.
U.S. Pat. No. 4,449,238 May 1984 Lee et al.
U.S. Pat. No. 5,003,532 March 1991 Ashida et al.
U.S. Pat. No. 5,117,285 May 1992 Nelson et al.
U.S. Pat. No. 5,347,306 September 1994 Nitta
U.S. Pat. No. 5,473,367 December 1995 Bales et al.
U.S. Pat. No. 5,479,203 December 1995 Kawai et al.

FIELD OF THE INVENTION

This invention relates to a video conferencing apparatus that is optimally suited for application into a round table video conferencing environment. The video conferencing apparatus that is described is comprised of a circular array of audio microphones and a video camera which is mounted onto a rotatable platform. Audio information captured by the circular array of microphones is processed to identify the azimuthal position of a principle speaker. The azimuthal position of the video camera is then electro-mechanically adjusted so as to accurately capture the image of the principle speaker.

DESCRIPTION OF THE PRIOR ART

Video conferencing is a popular means whereby individuals at physically distinct and remote locations are able to interact and exchange information through electronic means. A typical video conferencing setup will include apparatus for the capture and playback of audio and video information, apparatus for the electronic exchange of this information among at least two physically distinct and remote locations, and apparatus for managing the exchange of this information in an orderly manner among the distinct loctations. In practice, an audio microphone and speaker with their associated electronic circuitry will serve as the apparatus for the capture and playback, respectively, of the audio information; and similarly, a video camera and display with their associated electronic circuitry will serve as the apparatus for the capture and playback, respectively, of the video information. The exchange of the audio and video information among the remote locations is typically carried across an electronic communications network which may be either analog or digital in nature, and the exchange of this information is typically managed by computerized equipment which has been programmed to assemble the various information into a virtual electronic meeting place.

The prior art contains many examples relating to the implementation of various apparatus which enable and facilitate video conferencing. In general, there are two seperate and distinct types of video conferencing environments: single user video conferencing and group video conferencing. In a single user video conferencing environment, each individual that is involved in the video conference will typically be positioned in front of a video conferencing apparatus which is dedicated to the capture and playback of audio and video information specific solely for that individual. In a group video conferencing environment, the video conferencing apparatus will capture and playback audio and video information from a group of individuals who are physically located within a same room.

The dynamics of the two separate types of video conferencing environments differ from each other substantially. The dynamics of the single user video conferencing environment are generally well understood and therefore can be easily managed by most current art video conferencing apparatus. In the single user environment, a particular user is typically positioned before a video conferencing apparatus which is dedicated to the capture of audio and video information for that particular user. In the single user environment the position of the camera is fixed, and it is the user's responsibility to be positioned within the camera's field of view. Similarly, the position of the microphone is typically also fixed and it is the user's reponsibility to then address the microphone correctly. Once the single user audio and video information is captured, the video conference managing apparatus then manages the information from the various individuals participating in the video conference, but located at remote and distinct locations, such that the audio and the video information which represents each individual is then brought together into the virtual meeting place.

In contrast to the single user environment, the dynamics of the group video conferencing environment are substantially more complex and difficult to manage. In the group environment, the video conferencing apparatus must capture the audio and video information from a group of individuals who are located within a same room, and must present that information into the virtual meeting place in a manner that is natural and realistic. Typically the natural and realistic capture of audio information from the group environment is not problematic if the audio information is captured with omni-directional microphones, and if the audio information is then further processed using gain compensating electronics techniques. In this manner, good quality audio information can be captured into the virtula meeting place through the use of these well understood conventional means.

In a group video conferencing environment however the capture of video information is more problematic. In the group environment it is desirable that the video information be captured naturally and realistically, and preferably in a manner which does not interfere with the natural group dynamics and group interactions of the individuals who are participating in the video conference. For the most part, current state of the art video conferencing apparatus is not capable of capturing the video information present in a group video conferencing environment in a manner that is natural and realistic and in a manner that does not impact the natural human dynamics and interactions of the local group.

In current state of the art video conferencing apparatus, the video camera is typically positioned before the group of participants, and, in order that a complete image of the various participants be captured, the location of the each participants is restricted to be within the field of view of the video camera. Using this approach then the group of participants is made to act in many respects as a single participant with the natural dynamics of the local group interactions becoming unoviodably compromised, since now each member of the local group must face the video camera in order to be presented into the virtual meeting place in a naturalistic manner. Conversely, it is also problematic in this environment if a particalur individual member of the local group chooses not to face the video camera, since then the naturalness of the image of this paticular member as captured into the virtual meeting place is invariably compromised.

In order to provide an improved method for the the natural and realistic capture of video information in a group video conferencing environment, other implementations have proposed the use of fixed multiple video cameras so as to enable the capturing of video information from a multiplicity of differing angles, or the use of mobile video cameras to capture video information from the current active speaker in the group. In general, both of these alternate approaches also possess undesired shortcomings. The first approach involving the use of multiple fixed cameras necessitates a high equipment costs for the multiple cameras and for the required support electronics. Regardless of the additional cameras however, this approach still falls short of capturing each participant's image in a natural and realistic manner since the participants remain confined to the fields of view of the specific cameras. The second approach suggests the use of a mobile camera which can be operated to capture the specific image of the current designated speaker. With this second approach, it is possible to capture a more natural image of a group participant into a virtual meeting place. However this second approach necessitates the continuous manual operation of the video camera by one of the group members or by a dedicated camera operator, with both of these approaches again invariably imposing on and compromising the natural human dynamics of the group video conferencing environment.

SUMMARY OF THE INVENTION

Accordingly then, it is desirable to implement a video conferencing apparatus for specific application to a group video conferencing environment which overcomes the shortcomings of the various prior art devices. In particular, the following objects and advantages of a video conferencing apparatus for application to group video conferencing are desirable:

(a) to realize a video conferencing apparatus which is relatively uncomplicated in its design and therefore relatively inexpensive to manufacture, (b) to realize a video conferencing apparatus which will capture natural and realistic audio and video information from a group video conferencing environment, (c) to realize a video conferencing apparatus which will not interfere with the natural human dynamics which exist in a group video conferencing environment, (d) to realize a video conferencing apparatus which will automatically capture audio and video information from a group video conferencing environment without the need for manual supervision by a group member or by a dedicated operator.

Therefore, in keeping with the above stated objectives the inventors propose the video conferencing apparatus for group video conferences that is described herein. Two preferred embodiments of the invention are described by this specification. Both of the preferred embodiments of the invention are designed for ease of use and for ease of manufacture using current state of the art manufacturing processes. The design of both of the preferred embodiments described herein are also compatible with the current state of the art approaches and methodologies used to implement video conferences.

In the first preferred embodiment of the invention, a video conferencing apparatus is described which is comprised of a video camera and of a circular array of audio microphones. Both the camera and the radial array of microphones are mounted onto an integral unit which is centrally located amidst those individuals participating in the local group video conferencing environment. The azimuthal orientation of the camera is controlled by the audio information that is captured by the radial array of microphones. Audio information captured by the radial array of microphones is electronically processed such that a principle speaker is continuously identified based on a pre-programmed algorithm. With the principle speaker identified, the camera is then azimuthly positioned through electromechanical means such that the image of the principle speaker becomes accurately captured within the video camera's field of view.

In the second preferred embodiment of the invention, a video conferencing apparatus is described which is comprised of a multiple number of video cameras and of a circular array of audio microphones. In this second embodiment, the multiple video cameras are, like the microphones, also arranged into a radial array with each camera being dedicated to the capture of video information from within its own field of view. As in the first embodiment, audio information that is captured by the circular array of microphones is used to determine the approximate azymuthal location of a principle speaker. Once this location is identified, the appropriate video camera in the radial array of cameras is activated so as to capture the image of the recently identified speaker. The second embodiment also allows for a further fine adjustment of the azymuthal positioning of the video camera through electromechanical means so that the image of the recently identified speaker may be more accurately captured into the activated camera's field of view.

In comparing the first with the second embodiment, the first embodiment offers the advantage of implementing the the desired function through the use of a single video camera, thus minimizing the cost of the implementation, whereas the second embodiment, while necessitaing a greater cost to implement, will implement the desired function in a manner which is potentially more responsive to the dynamics of the group video conferencing environment, and whose operation will be less ubiquitous during the course of the video conference.

Both embodiments of the invention achieve the desired goals. Namely, both embodiments provide a means by which both audio and video information from a group video conferencing environment can be captured naturally and realistically and with a minimal disruption to the natural dynamics and interactions of the video conferencing group. Both embodiments provide a means for the natural and realistic capture of audio and video information with minimal continuous operator intervention. Finally, both embodiments demonstrate an inherently uncomplicated design which can be easily manufactured. A more detailed description of the preferred embodiments of the invention are provided by the insuing drawings and by the accompanying descriptions.

DESCRIPTION OF THE PREFERRED EMBODIMENTS

Figure 1:
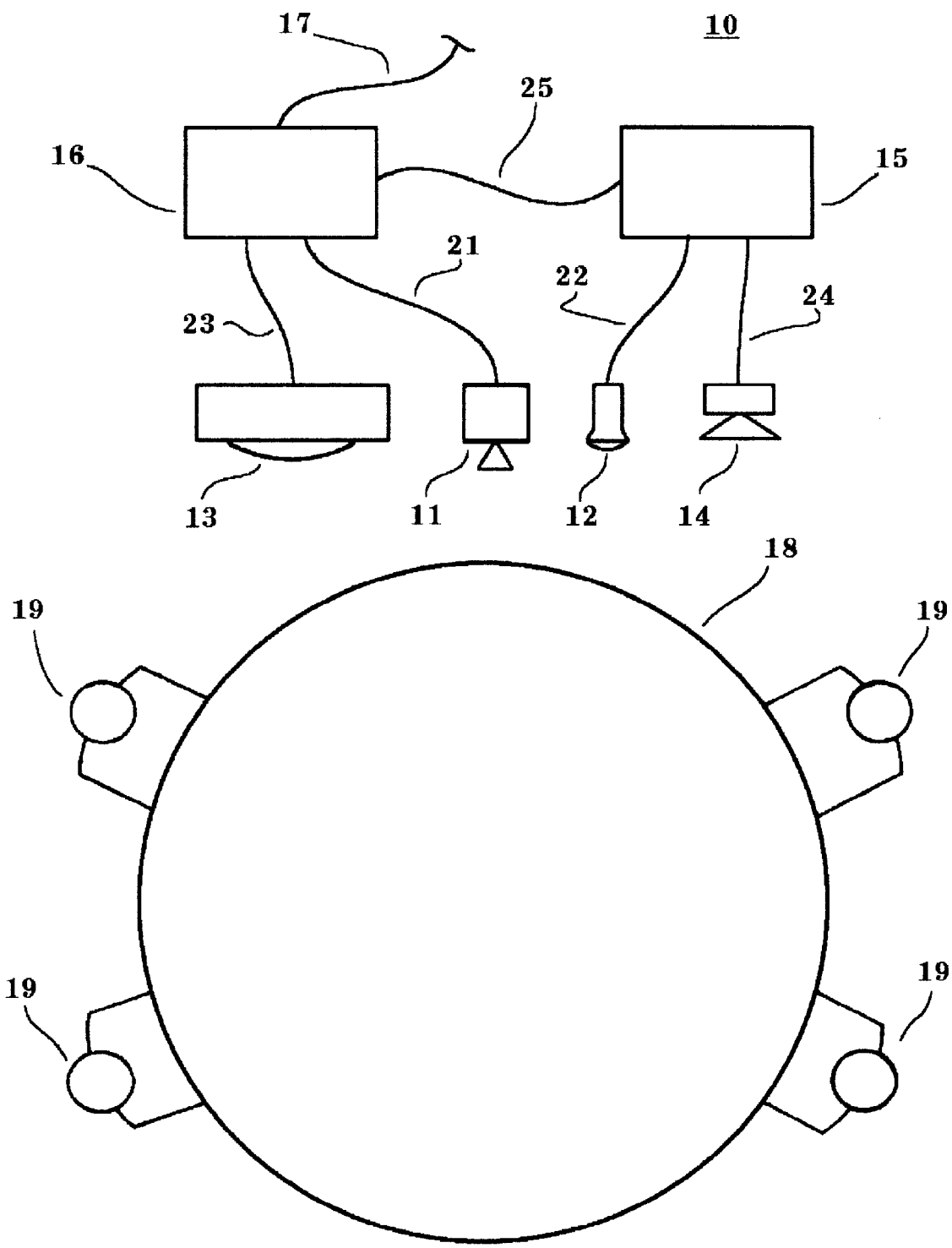
FIG. 1 shows a top plan view of a group video conferencing environment wherein a conventional group video conferencing apparatus is employed.

Referring now to the drawings, FIG. 1 shows a symbolic top plan view of a group video conferencing environment which employs a conventional group video conferencing apparatus 10. Typically conventional group video conferencing apparatus 10 will consist of a video camera 11 for the capture of video information, a microphone 12 for the capture of audio information, a video display 13 to display video information from the remotely located participants of the video conference, an audio speaker 14 to provide audio from the remotely located participants of the video conference, a duplex unit 15 to enable the simultaneous exchange of audio information, and an electronic video conferencing management unit 16 that is connected into an electronic communications network 17. It is the function of video conferencing management unit 16 to manage the exchange of the various audio and video information over electronic communication network 17 and to appropriately manage and assemble this information into the virtual meeting place. A more detailed description of the operation of video conferencing management unit 16 lies beyond the scope of this specification, is not relevant to the claims of this specification, and so is not provided herein.

The disparate units are interconnected by way of various cables. Video camera 11 connects into video conferencing management unit 16 by way of video camera cable 21, and the video output from video conferencing apparatus 10 connects into video display 13 by way of video display cable 23. The audio output from audio microphone 12 and the audio input to audio speaker 14 are connected to duplex unit 15 by way of audio microphone cable 22 and audio speaker cable 24 respectively. Duplex unit 15 is connected to video conferencing management unit 16 by way of duplex cable 25.

In a group video conferencing environment, video conferencing apparatus 10 will typically be positioned at the head of a meeting table 18, and the local participants 19 involved in the video conference will typically be seated about meeting table 18.

Audio microphone 12 is positioned so as to capture the audio information that is produced by the various local participants 19 while audio speaker 14 is used to reproduce the audio information from the various remote participants in the video conference. Duplex unit 15 performs the appropriate echo-cancellation functions so as to permit simultaneous full duplex conversation to take place betwen the local and the remote participants in the video conference. As with video conferencing managment unit 16, a more detailed description of the operation of duplex unit 15 lies beyond the scope of this specification, is not relevant to the claims of this specification and so is not provided herein.

Video camera 11 is typically positioned at one end of meeting table 18 so as to capture the video image of each local participant 19 that is seated about meeting table 18. Similarly, video display 13 is also positioned at one end of meeting table 18, usually next to video camera 11. Using this arrangement, the video information required for the video conference can be easily presented to and captured from the group of local participants 19. The fixed location of video camera 11 however imposes several restrictions on the natural and realistic quality of the video infromation that is captured into the virtual meeting place environment. For example, since the field of view of video camera 11 is limited, the location of each local participant 19 becomes similarly limited to being within this field of view. Additionally, each local participant 19 must face video camera 11 in order that his image be discernably captured into the virtual meeting place by video camera 11. For a large enough group of local particpants the danger will exist that the image of those local participants seated furthest from video camera 11 may be captured so as to not be discemable at all.

The fixed location of video camera 11 will also impose some unavoidable restrictions onto the natural human dynamics and interactions of the local video conferencing group. For example, within the local group video conferencing environment, the group dynamics will be such that each local participant 19 will interact with each other local participant 19, and also interact with the audio and video information that is provided by display 13 and speaker 14 of video conferencing apparatus 10. Given these varied interactions, it becomes difficult for video camera 11 to realistically and naturally capture the various group dynamics from the local environment given its fixed position at the end of meeting table 11. Similarly, the requirement that each local participant 19 must face video camera 11 invariably also compromises and limits the local group interaction for that particular participant.

Figure 2:
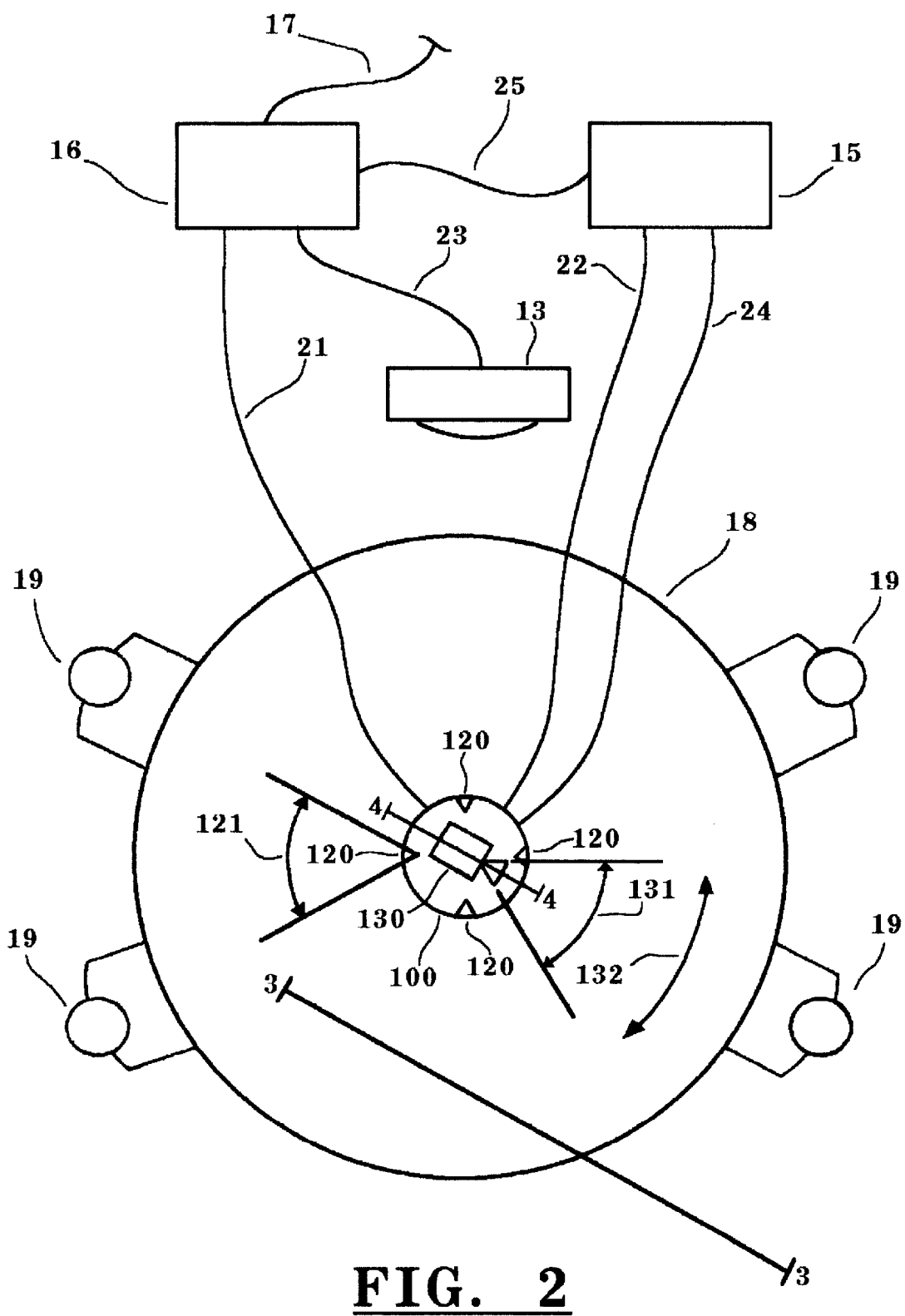
FIG. 2 shows a top plan view of a local group video conferencing environment wherein the first embodiment of the proposed group video conferencing apparatus is employed.

Referring now to FIG. 2, a top plan view of a group video conferencing environment is shown wherein the first embodiment of the proposed video conferencing apparatus is employed. As FIG. 2 indicates, first video conferencing apparatus 100 is placed onto and approximately at the center of meeting table 18, such that, during the course of the video conference, each local participant 19 in the video conference is seated about meeting table 18 so as to face first video conferencing apparatus 100 direcly.

During the course of a video conference first video conferencing apparatus 100 is used to capture both the audio and the video information from each local participant 19 in the local group video conferencing environment. An audio speaker located onto the underside of first video conferencing apparatus 100 is used to reproduce audio information that is generated by the remote participants in the video conference. Video display 13, which is located at one end of meeting table 19 is used to display the video information that is generated by the remote participants in the video conference.

As with video conferencing apparatus 10, video conferencing management unit 16 is used to manage the exchange of the various audio and video information over electronic communication network 17 and to appropriately manage and assemble this information into the virtual meeting place. Duplex unit 15 is used to enable the full duplex simultaneous exchange of audio information among the local and the remote participants in the video conference. Video display 13 connects into video conferencing management unit 16 by way of video display cable 23, and the video output from first video conferencing apparatus 100 connects into video conferencing management unit 16 by way of video camera cable 21. The audio output and the audio input of first video conferencing apparatus 100 are connected to duplex unit 15 by way of audio speaker cable 24 and audio microphone cable 22 respectively, with duplex unit 15 then being connected to video conferencing management unit 16 by way of duplex cable 25. Thus, in many respects, first video conferencing apparatus 100 is similar to video conferencing apparatus 10, with the exception that the video capture, the audio capture, and the audio generation functions are integrated into a compact central module which can be centrally and unobtrusively located into the local group video conferencing environment so as to enable the more realistic capture and exchange of audio and video information during the course of the video conference.

Describing first video conferencing apparatus 100 now in more detail, first video conferencing apparatus 100 is comprised of a generally circular base unit 110 into which there is mounted a radial array of audio microphones 120 and also onto which is centrally mounted a video camera 130. Each audio microphone 120 is of the type having strongly directional audio capture capability such that each audio microphone 120 will predominantly capture audio information which eminates from within the audio conic section 121 that is associated with each audio microphone 120. Similarly, video camera 130, which is directional by nature, will only capture video information that is present within the video field of view 131.

During the course of the group video conference, each audio microphone 120 will capture audio information that originates from within its corresponding audio conic section 121. Electronic circuitry internal to novel video conferencing unit 100 then processes this audio information using a predefined algorithm to to identify the azymuthal position of that specific local participant 19 who is currently the primary speaker in the group of local particpants participating in the video conference. Once the principle speaker in the local group of participants is identified, video camera 130 is then azimuthally positioned in either the clockwise or the counter clockwise direction that is indicated by the azymuthal line of travel 132, with azimuthal line of travel 132 being essentially confined to a geometric plane which is parallel to the top surface of meeting table 18. The azymuthal positioning of video camera 130 is realized by way of electromechanical means that are internal to first video conferencing apparatus 100 and which will azymuthally position video camera 130 such that the video image of the most currently identified principle speaker is brought into field of view 131 of video camera 130. In this manner then, the image of the principle speaker is captured by video camera 130 in a manner that is both natural and realistic and in a manner that is unobtrusive to the various dynamics and interactions that are ongoing in the local group video conferencing environment.

For proper design, it is necessary that a sufficient number of audio microphones 120 are radially arranged onto first video conferencing apparatus 100 such that audio information can be adequately captured from the full 360 degrees of azymuthal span about first video conferencing apparatus 100. In the design of first video conferencing apparatus 100, eight radially arranged audio microphones 120 are used, with each audio microphone 120 dedicated to the capture of audio information from a conic section which spans a 45 degrees of azimuth about first video conferencing apparatus 100. Using this arrangement, it is possible to azimuthally position video camera 120 to an accuracy of 45 degrees using a simple algorithm to process the audio information that is captured by the circular array of audio microphones 120. A more accurate azymuthal positioning of video camera 130 is possible through the use of more sophisticated algorithms to process the audio information that is captured by the circular array of audio microphones and then subsequently interpolate a more accurate azymuthal position beyond an accuracy of 45 degrees. As described herein however, first video conferencing apparatus 100 relies on a simple positioning algorithm to azymuthally position video camera 130 to the 45 degree accuracy that is obtainable by a simplified processing of the audio information that is captured by the circular array of eight audio microphones 120. Under this approach then, video camera 120 must have a field of view which is 45 degrees, or preferably greater, to capture a full image of the selected principle speaker.

Figure 3:
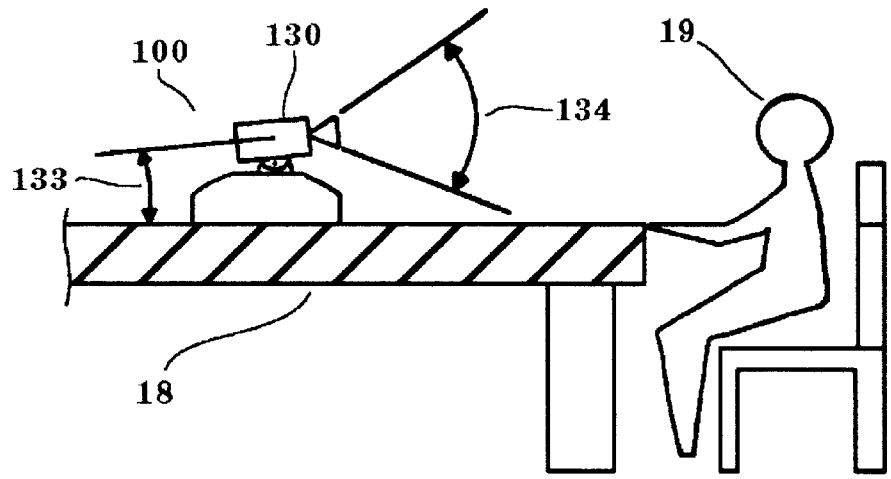
FIG. 3 shows a cross-sectional view of the local group video conferencing environment shown by FIG. 2 taken along line 3—3 of FIG. 2.

FIG. 3 now shows a cross-sectional view of the group video conferencing environment depicted by FIG. 2 along line 3—3 of FIG. 2. As FIG. 3 indicates, video camera 130 is typically positioned and tilted at an appropriate verticle angle 133 relative to the top surface of meeting table 18 such that an an adequate image of local participant 19 can be adequately captured into the virtual meeting place. In general, verticle angle 133 at which video camera 130 is tilted is initially set through manual means at the start of the video conference, and, once set, will remain so fixed throughout the course of the video-conference. Since the majority of the participants in the local group video conference environment are typically seated at a similar height relative to the height of meeting table 18, there will not be a need to provide any automatic re-adjustment capability of vertical angle 133 provided that the verticle field of view 134 of novel video camera 130 is sufficient to capture a correct image of the selected principle speaker.

Figure 4:
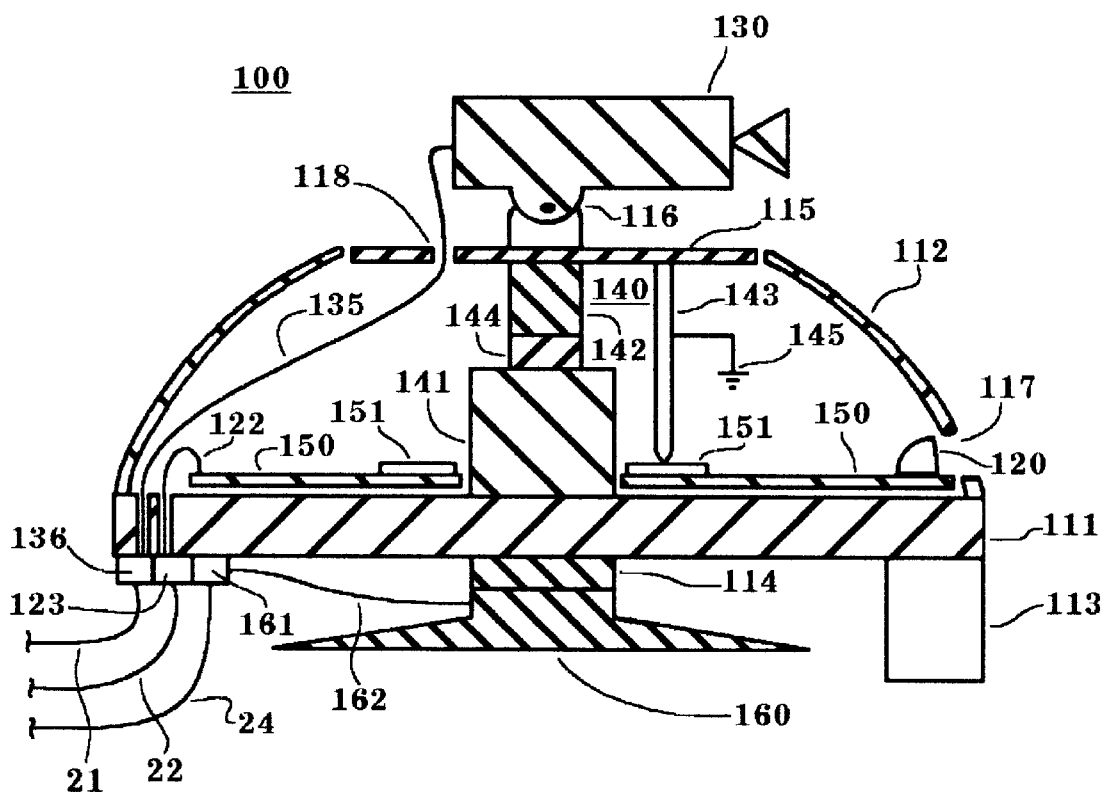
FIG. 4 shows a cross-sectional view taken along line 4—4 of FIG. 2 of the first embodiment of the proposed group video conferencing apparatus.

FIG. 4 now shows a cross-sectional view taken along line 4—4 of FIG. 2 of first video conferencing apparatus 100 in more detail. As FIG. 4 shows, first video coferencing apparatus 100 is comprised of the previously described base unit 110, a multiple number of audio microphones 120, and video camera 130. The other principle components which also comprise first video conferencing apparatus 100 are a video camera positioning assembly 140, a first electronic circuit board 150, and an audio speaker 160.

As FIG. 4 indicates, base unit 110 is comprised of a circular base platform 111, an annular convex enclosure 112, and a circular platform 115. Base platform 111 is a flat circular panel onto which most of the various components comprising novel video conferencing apparatus 100 are affixed. The outer peripheri of annular convex enclosure 112 is affixed to the outer peripheri of circular base platform 111, with annular convex enclosure 112 rising upwards above the upper surface of circular base platform 111 to define an enclosed circular space for housing the majority of the components which comprise first video conferencing apparatus 100. Circular base platform 111 is supported above the height of meeting table 18 by supporting posts 113 which are rigidly and and peripherally affixed to the lower surface of circular base platform 111. Supporting posts 113 are of a sufficient height so as to define a space beneath circular base platform 111 which is adequate to contain audio speaker 160. Audio speaker 160 is mounted onto the lower surface of circular base platform 111 with mounting posts 114. Preferably, mounting posts 114 should be formed of an accoustically insulative material so as to provide some degree of accoustical isolation between audio speaker 160 and circular base platform 111. The audio signals produced by audio speaker 160 will emanate from the underside of novel video conferencing apparatus 100 while first video conferencing apparatus 100 is operational during the course of a video conference.

The inner periferi of convex annular enclosure 112 defines a circular opening into which is located circular platform 115. Video camera 130 is mounted concentrically onto the upper surface of circular platform 1 15 by means of pivot joint 116. Pivot joint 116 is rigidly affixed to the upper surface of circular platform 115, and novel video camera 130 is mounted onto pivot joint 116 in a manner that permits novel video camera 130 to be pivoted and fixed at the desired verticle angle 134. Circular platform is mounted onto and positioned by the video camera positioning assembly 140, the operation of which is described subsequent to the description of first circuit board 150.

First circuit board 150 is a donut shaped electronic circuit board which is mounted onto the upper surface of circular base platform 111 and which contains the various electronic components and circuitry necessary for the proper operation of first video conferencing apparatus 100. Each audio microphone 120 is mounted onto first circuit board 150 so as protrude out to the exterior of first video conferencing apparatus 100 through openings 117 that are formed into the structure of convex annular enclosure 112. Video wire assembly 135 electrically connects the video signal from video camera 130 to video output connector 136. Video output connector 136 feeds the video signal to the exterior of circular base platform 111 and connects the video signal into video camera cable 21. Video wire assembly 131 enters into the interior of first video conferencing apparatus 100 through a first hole 118 formed into the structure of circular platform 115, and, for best operation it is preferable to incorporate sufficient slack into video wire assembly 135 such that circular platform 115 is free to rotate unimpeded.

Microphone wire assembly 122 is used to connect the composite microphone signal generated by first circuit board 150 to microphone output connector 123. The composite microphone signal is the summed and amplified output of each audio microphone 120 that is located onto first circuit board 150 and is the audio input signal that first video conferencing apparatus 100 provides to duplex unit 15. The composite microphone signal is connected to duplex unit 15 by way of audio microphone cable 22. Similarly, the audio output signal that is provided by duplex unit 15 is connected to first video conferencing apparatus 100 by audio speaker cable 23. Audio speaker cable 23 connects to first video conferencing apparatus 100 at speaker input connector 161, and speaker wire assembly 162 is then used to connect the audio output signal from speaker input connector 161 to audio speaker 160.

The azimuthal orientation of video camera 130 is controlled by the workings of video camera positioning assembly 140, wherein video camera positioning assembly 140 is comprised of a platform motor 141, a verticle support rod 142, and a rotational positional indicator 143.

Platform motor 141 is rigidly and concentrically affixed to the top surface of circular base platform 111 in a manner that preferably provides a maximum degree of vibrational isolation between platform motor 141 and circular base platform 111. Platform motor 141 is also rigidly affixed to circular platform 115 by way of verticle support rod 142, wherein the lower end of verticle support rod 142 is concentrically affixed to the rotor shaft 144 of platform motor 141, and the upper end of verticle support rod 142 is concentrically affixed to the lower surface of circular platform 115. Video camera 130 is affixed onto the upper surface of circular platform 115 through pivot joint 115 wherein pivot joint 115 allows video camera 130 to be vertically pivoted to a desired angle of tilt. The azimuthal orientation of video camera 130 is controlled by platform motor 141 whereby platform motor is capable of rotating in either a clockwise or a clockwise direction.

The azimuthal orientation of circular platform 115, and hence of novel video camera 130, is sensed through the use of rotational position indicator 143. Rotational position indicator 143 is formed as an electrically conductive rod whose electrical potential is held at an electrical ground potential as indicated by schematic ground symbol 145. The upper end of rotational position indicator 143 is affixed to the lower surface of circular platform 115 and hence will rotate azimuthally in keeping with the azimuthal orientation of circular platform 115. The lower end of rotational position indicator 143 is made to come into contact with the upper surface of circuit board 150 and is arranged so as to swipe along the upper surface of circuit board 150 as circular platform 115 rotates azimuthally. With this arrangement, the azimuthal position of circular platform 115 is then sensed by a circular array of eight conductive pads 151 which are formed as exposed conductive patterns affixed onto the top surface of circuit board assembly 150. Each respective conductive pad 151 is located so as to be in the path of the circular orbit of rotational position indicator 143 and located so as to make electrical contact with the lower end of rotational position indicator 143 once the lower end of rotational position indicator 143 swipes over each respective conductve pad 151. For the design of first video conferencing apparatus 100, a number of eight conductive pads 151 are used, thus providing an azimuthal position accuracy of 45 degrees for the azimuthal positioning of video camera 130. The use of eight conductive pads 151 also permits the use of a simplified positioning algorithm wherein the azimuthal orientation of video camera 130 is directly correlated to the magnitude and the duration of the audio signal that is captured by each of the eight audio microphones 120 that are mounted onto first circuit board 150.

Normally the electrical potential of each conductive pad 150 is biased at a value above ground potential through a resistive element that is connected between a positive electric potential and each conductive pad 151. Once rotational position indicator 143 makes contact with a specific conductive pad 151, the electrical potential of the contacted conductive pad 151 is then forced to the same ground potential that rotational position indicator 143 is biased to. This change in the electrical potential of the contacted conductive pad 151 is sensed by electronic circuitry that is mounted onto first circuit board 150, and in this manner, the azimuthal orientation of rotational position indicator 143, and hence of circular platform 115, is then ascertained.

Figure 5:
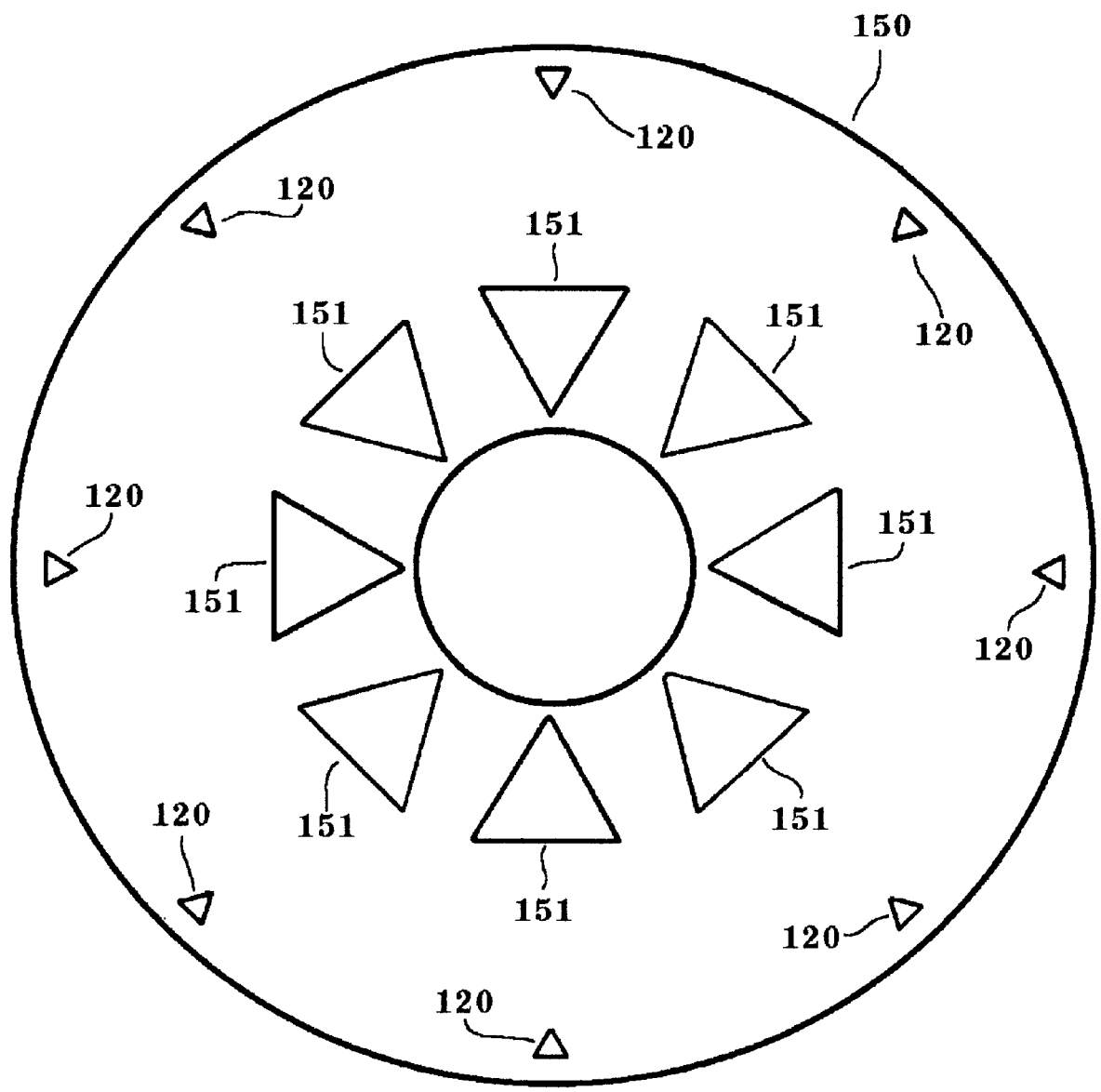
FIG. 5 shows a top plan view of the electronic circuit board of the first embodiment of the proposed group video conferencing apparatus.

FIG. 5 now shows a top plan view of first circuit board 150 wherein the radial array of audio microphones 120 and the radial array of conductive pads 152 are both indicated. For proper design, the radial array of audio microphones 120 are best located at the outer peripheri of electronic circuit board 160 so that each audio microphone 120 is best positioned to capture and the audio information from the local group video conferencing environment. Also for proper design, the radial array of conductive pads 151 are best located at the inner peripheri of electronic circuit board 150 near to the location where platform motor 140 is mounted. When so located, conductive pads 151 will then be optimally positioned so as to easily make contact with the lower tip of rotational position indicator 143 as it swipes across the surface of first circuit board 150.

Also located onto first circuit board 150 but not shown by FIG. 5 are the various electronic circuitry and components that are necessary to implement the various electronic functions necessary for the proper operation of first video conferencing apparatus 100. In general, the detailed design of this electronic circuitry is arbitrary as there are numerous possible methods for the detailed implementation of the necessary functions. However, as it is the object of this specification to teach the correct working of first video conferencing apparatus 100, a broad description of the necessary electronic functions is subsequently provided by FIG. 6 for completeness.

Figure 6:
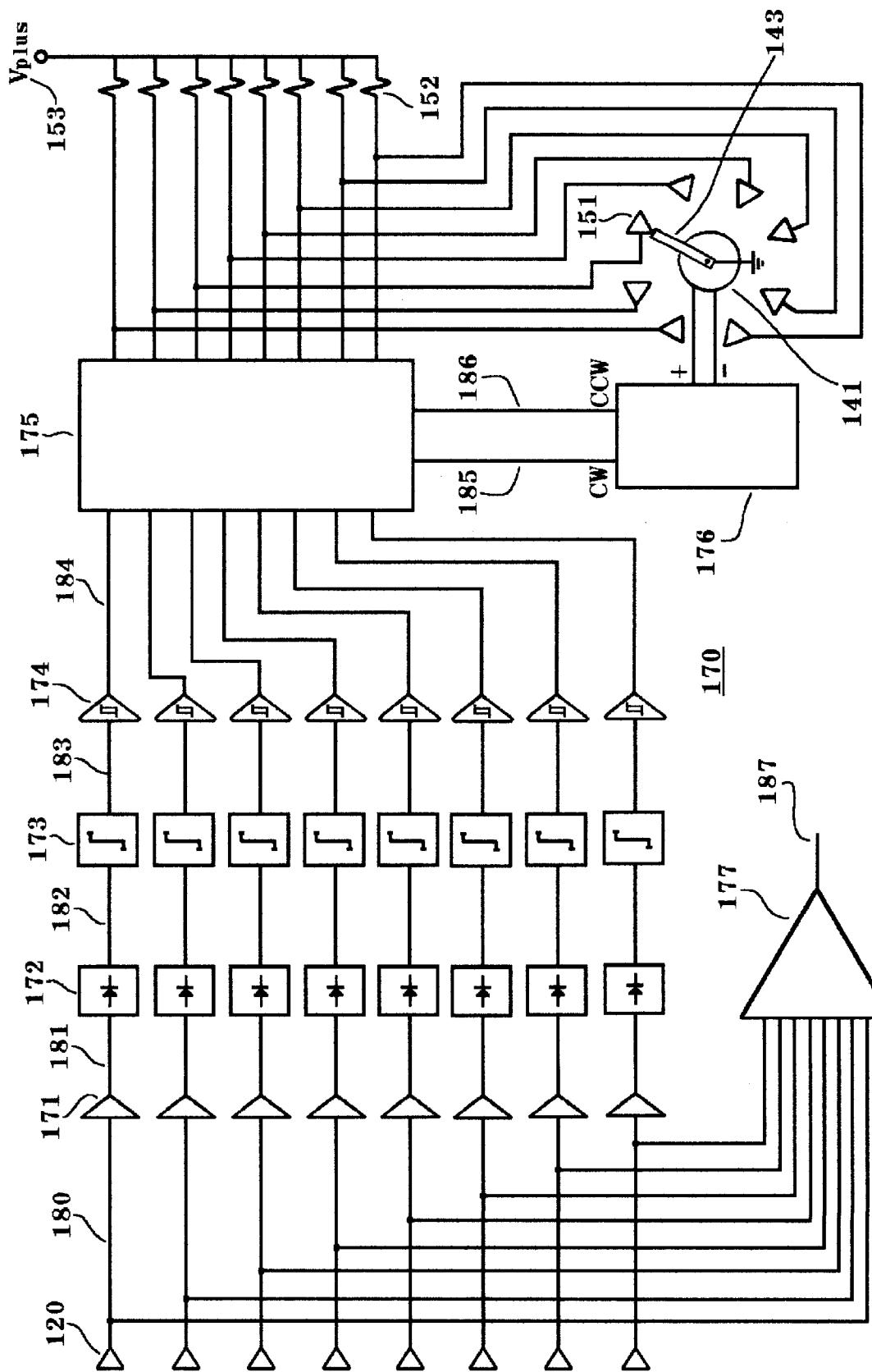
FIG. 6 shows a block diagram depiction of the electronic componentry of the first embodiment of the group video conferencing apparatus.

FIG. 6 shows a block diagram depiction of the electronic circuitry 170 that is required for proper operation of first video conferencing apparatus 100. As FIG. 5 indicates, the respective electrical audio signal 180 from each of the eight audio microphones 120 is input into a respective dedicated audio signal amplifier 171 which amplifies audio signal 180 to produce amplified audio signal 181. Each respective amplified audio signal 181 is then fed into a respective audio signal rectifier 172 which electrically rectifies amplified audio signal 181 to produce a respective rectified audio signal 182. Each respective rectified audio signal 182 is then fed to a respective audio signal integrator 173 each of which generates a respective averaged audio signal 183. Each averaged audio signal 183 is a time averaged value of the respective rectified audio signals 182, wherein the integrating time constant of each audio signal integrator 173 is chosen so as to be appropriate for integrating the characteristics of human speech for the purposes of identifying the principle speaker from among the group of individuals participating in the local group video conference. Typically an integrating time constant which is of the order of 10–20 seconds will be appropriate for identifying the type of speech activity which is appropriately loud and appropriately sustained, as would be characteristic of the speech pattern of a principle speaker in the local group video conferencing environment.

Each respective averaged audio signal 183 is fed into a respective level comparator 174 which quantizes the average audio signal 183 into a respective logical '0' or a logical '1' digital signal 184 determined by whether the magnitude of average audio signal 183 is less than or greater than a preset threshold. For stability, it is desirable that some degree of hysteresis is incorporated into the transfer characteristics of level comparator 174 such that the input threshold for declaring a logical '1' is chosen to be greater than the input threshold for declaring a logical '0'. This is a commonly accepted technique for minimizing oscillatory behavior in comparator circuitry.

The quantized outputs of each level comparator 174 are then provided to a block of control logic 175 which is used to arbitrate the logical outputs of each level comparator 174 to determine which audio channel is currently active as the principle speaker. Control logic 175 is programmed to identify the principle speaker based on a preset algorithm, and once control logic 175 has made an identification of the principle speaker, the azimuthal positioning of video camera 130 is adjusted so as to capture the image of the principle speaker.

In order to azimuthally position video camera 130, control logic 175 monitors the bias state of each conductive pad 151 and is thus able assertain the azimuthal position of circular platform 115, and hence of video camera 130. If video camera 130 needs to be repositioned so as to point to a newly identified principle speaker, control logic 175 will activate either the rotate clockwise output 185 or the rotate counter clockwise output 186 as required. The rotate clockwise output 185 and the rotate counter clockwise output 186 are both inputs to the platform motor drive circuitry 176 wherein platform motor drive circuitry 176 supplies the correct bias voltage to platform motor 141 so as to bring about a clockwise or a counter clockwise rotation of circular platform 115. If both rotate clockwise output 176 and rotate counter clockwise output 177 are inactive, then platform motor 141 and hence circular platform 115 remain stationary.

As platform motor 141 is made to rotate, rotational position indicator 143 is correspondingly made to swipe across the radial array of conductive pads 151. Normally, each conductive pad 151 is biased through a respective biasing resistor 152 to an electric potential that is higher than electric ground. Each respective biasing resistor 152 is connected between a respective conductive pad 151 and a positive non-ground electric potential Vplus 153. As rotational position indicator 143 makes contact with a specific conductive pad 151 the electrical potential of that particular conductive pad 151 will be forced to electrical ground, and this change in the electrical bias of the particular conductive pad 151 is then sensed by control logic 175. During the period wherein video camera 130 is azimuthally repositioned, control logic 175 will continue to request a rotation of platform motor 141 until an electrical ground potential is sensed on the specific conductive pad 151 which correlates to the desired azimuthal positioning of video camera 130.

The other electronic circuitry and components which are located onto circuit board 150 are the power supply and the composite audio output circuitry 177. The power supply circuitry is neccessary for providing the necessary electric operating voltages to the various electronic components which have been described, but for conciseness, this power supply circuitry is not indicated by FIG. 6. Indicated by FIG. 6 however is composite audio circuitry 177, which is responsible for generating an output composite audio signal 187 which is the summation of the each audio signal 180 from each respective audio microphone 120. As previously described, composite audio signal 187 represents the captured audio information from the local group video conferencing environment which is then subsequently provided to duplex unit 15.

Figure 7:
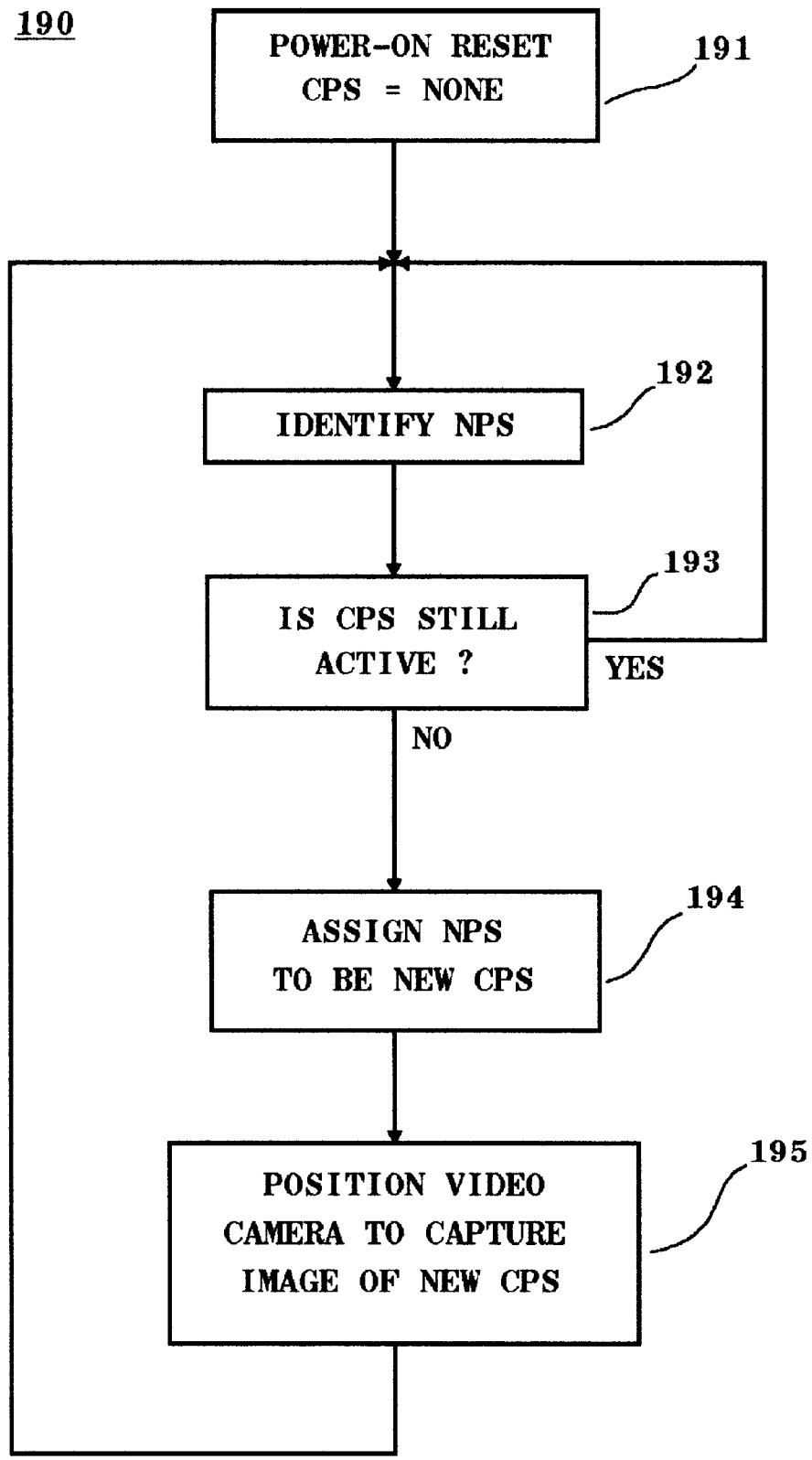
FIG. 7 shows the general algorithm by which the video camera of the first embodiment is azimuthally positioned during the course of a group video conference.

The logical control algorithm which is programmed into control logic 175 is shown by FIG. 7. First control algorithm 190 is shown by FIG. 7 in a general block diagram format and is presented herein as a possible algorithm which may be implemented for controlling the functioning of first video conferencing apparatus 100. It should be apparent to those skilled in the art that differing control algorithms may also be implemented, within the context of the components described by this specification, which would achieve similar results; and conversely, it would also be possible to apply control algorithm 190 to an implementation of components which differs from the particular implementation that comprises first video conferencing apparatus 100.

As FIG. 7 indicates, first control algorithm 190 begins with power-on reset step 191 wherein first video conferencing apparatus 100 is first powered on and activated. At this point in the operation of first video conferencing apparatus 100, a current principle speaker, CPS, is undetermined and is therefore unassigned. It is in new speaker detection step 192, that a new principle speaker, NPS, is identified. In first video conferencing apparatus 100 a detection of the NPS is made by way of a particular level comparator 174. When a particular digital signal 184 changes state from a logical '0' to a logical '1', this indicates that an audio signal characteristic to that of a principle speaker has been captured by the audio microphone 120 that is respective to the particular digital signal 184 that is at a logical '1'. Following new speaker detection step 192 is new speaker affirmation step 193, wherein first control algorithm 190 insures that the CPS is inactive prior to designating the NPS to be the new CPS. In first video conferencing apparatus 100, the CPS is determined to be inactive if the particular digital signal 184 respective to the particular audio microphone 120 which corresponds to the azimuthal location of the CPS has returned to a logical '0' level. If the CPS is indeed inactive, then first control algorithm 190 continues to new speaker assignment step 194 wherein the NPS is assigned to be the new CPS. Else first control algorithm returns again to new speaker detection step 192. Once a new CPS assignment has been made, first control algorithm 190 will then adjust the azimuthal position of video camera 130 through the workings of camera positionong assembly 140 so that the video image of the newly designated CPS is captured by video camera 130.

Figure 8:
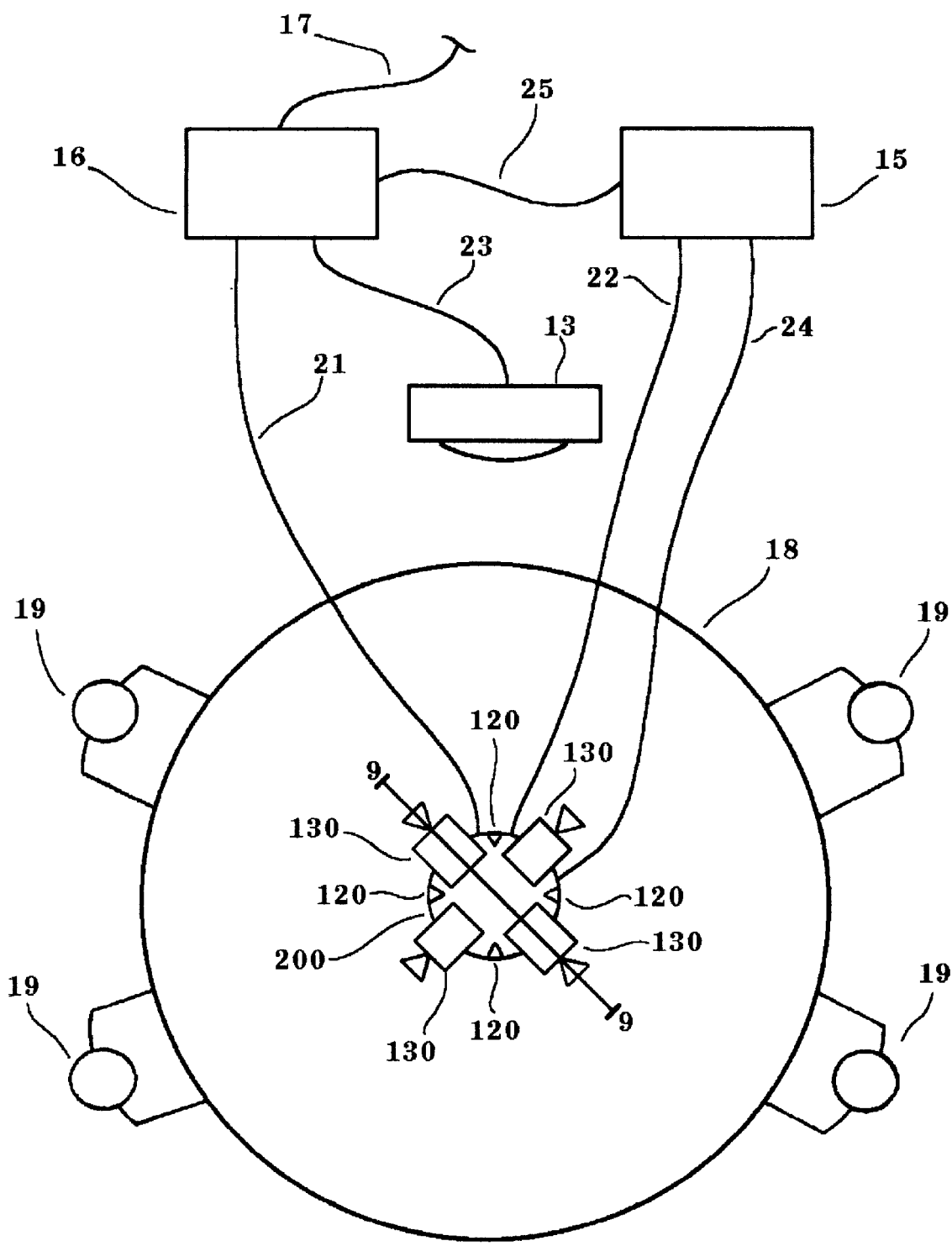
FIG. 8 shows a top plan view of the second embodiment of the proposed group video conferencing apparatus.

FIG. 8 now shows a top plan view of a group video conferencing environment wherein a second embodiment of the invention is employed. As FIG. 8 indicates, second video conferencing apparatus 200, like first video conferencing apparatus 100, is also placed onto and approximately at the center of meeting table 18. Again, each local participant 19 in the video conference is seated about meeting table 18 so as to face second video conferencing apparatus 200 directly.

Second video conferencing apparatus 200 shares many features in common with first video conferencing apparatus 100. Like first video conferencing apparatus 100, second video conferencing apparatus 200 is similarly comprised of a generally circular base unit 110 into which there is mounted a radial array of audio microphones 120 each having a directional audio signal capture characteristic. The audio information that is captured by each audio microphone 120 is electronically processed so as to identify the azimuthal orientation of the principle speaker from among the group of participants. Once the principle speaker has been identified, the electronic circuitry that is located within second video conferencing apparatus 200 will act to capture the video image of the principle speaker by activating the appropriate video camera from among the group of four video cameras 130 which are mounted in a circular array onto circular platform 115.

Second video conferencing apparatus 200 principally differs from first video conferencing apparatus 100 by employing a number of four video cameras 130 that are mounted onto second video conferencing apparatus 200 in a circular array. The video cameras are arranged so as to capture video information from the full azimuthal span about second video conferencing apparatus 200. Once a new principle speaker has been identified by second video conferencing apparatus 200, the appropriate video camera is activiated so as to capture the image of the new principle speaker. In addition, second video conferencing appartus 200 then also has the ability to center the the image of the new principle speaker into the field of view the activated video camera by subsequently mechanically adjusting the azimuthal orientation of the activated video camera.

Like first video conferencing apparatus 100, the video signal output from second video conferencing apparatus 200 is also connected to video conferencing management unit 16 by way of video camera cable 21. Similarly, the audio output and the audio input of second video conferencing apparatus 100 are connected to duplex unit 15 by way of audio speaker cable 24 and audio microphone cable 22 respectively, with duplex unit 15 then being connected to video conferencing management unit 16 by way of duplex cable 25. Video display 13 connects into video conferencing management unit 16 by way of video display cable 23, and video conferencing managment unit manages the exchange of the various audio and video information necessary for the video conference over electronic communication network 17.

The use of multiple video cameras for the capture of video information from the local video conferencing environment offers second video conferencing apparatus 200 the advantage of being able to capture the video image of a newly identified principle speaker more quickly and with less electromechanical activity and noise than would be possible with a single video camera approach. However, the advantages provided by a multiple video camera approach are realized, of course, at the expense of the greater component cost associated with having a multiple number of video cameras. Thus, it is envisioned that first video conferencing apparatus 100 will be preferred when a low cost implementation of the video conferencing functions is desired, and second video conferencing apparatus 200 will be preferred when a higher degree of functionality is required.

Figure 9:
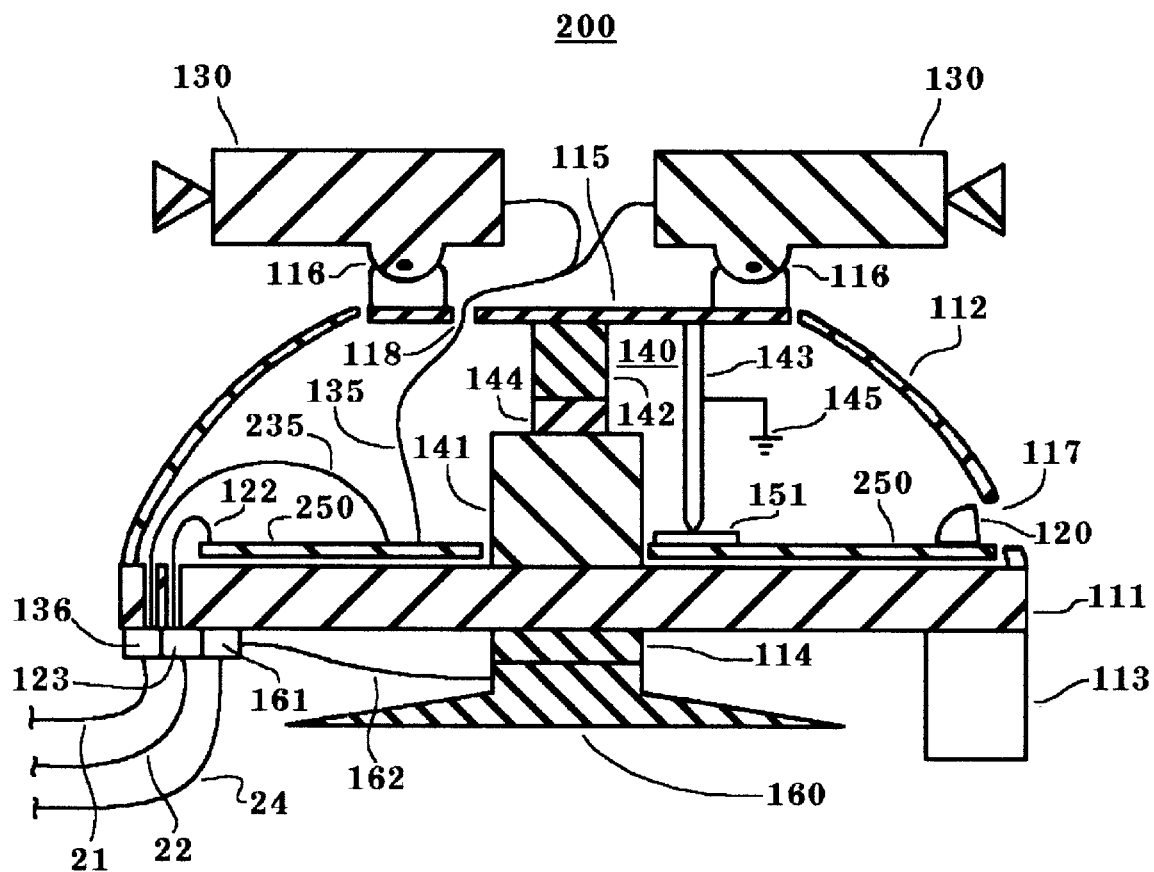
FIG. 9 shows a cross-sectional view taken along line 9—9 of FIG. 8 of the second embodiment of the proposed group video conferencing apparatus.

FIG. 9 now shows a detailed cross sectional view of second video conferencing apparatus 200 along line 9—9 that is shown in FIG. 8. Again many of the functional elements found in first video conferencing apparatus 100 are also found in second video conferencing apparatus 200. Second video conferencing apparatus 200 is similarly comprised of base unit 110, a multiple number of audio microphones 120, video camera positioning assembly 140, audio speaker 160, and a second electronic circuit board 250. Each video camera 130 is electrically connected to second electronic circuit board 250 with a respective video wire assembly 135. Each video wire assembly 135 enters into the interior of second video conferencing apparatus 200 through a first hole 118 formed into the structure of circular platform 115, and, for best operation it is preferable to incorporate sufficient slack into each video wire assembly 135 such that the circular platform 115 is free to rotate unimpeded.

The video signal originating from the currently active video camera is electronically multiplexed onto second video wire assembly 235 which connects the multiplexed video image from second electronic circuit board 250 to video output connector 136. Video output connector 136 then feeds the multiplexed video signal out to the exterior of second video conferencing apparatus 200 and connects the video signal into video camera cable 21.

Microphone wire assembly 122 is used to connect the composite microphone signal generated by second circuit board assembly 250 to microphone output connector 123. The composite microphone signal is the summed and amplified output of each audio microphone 120 that is located onto second circuit board assembly 250 and is the audio input signal that second video conferencing apparatus 200 provides to duplex unit 15. The composite microphone signal is connected to duplex unit 15 by way of audio microphone cable 22. Similarly, the audio output generated by duplex unit 15 is connected to second video conferencing apparatus 200 by audio speaker cable 23. Audio speaker cable 23 connects to second video conferencing apparatus 200 at speaker input connector 161, and speaker wire assembly 162 is then used to connect the audio output signal from speaker input connector 161 to audio speaker 160.

The basic theory of operation which governs the functioning first video conferencing apparatus 100 also applies to the the functioning of second video conferencing apparatus 200 with the exception that second video conferencing apparatus 200 makes use of the added capability provided by having an array of four video cameras 130. As in the first embodiment, audio information that is captured by the circular array of audio microphones 120 is processed by electronic circuitry that is located onto second electronic circuit board 250 and the azimuthal location of the principle speaker is identified based on a preset algorithm. Once the azimuthal location of the principle speaker is identified, the appropriate video camera 130 in the radial array of video cameras is activated so as to capture the image of the recently identified speaker within the field of view of the activated camera. The image of the principle speaker is then centered within the field of view of the activated video camera by rotating video platform 115 in a clockwise or in a counter clockwise direction by activating a corresponding clockwise or counterclockwise rotation of platform motor 141. Platform motor 141 is deactivated once rotational position indicator 140 indicates that a rotation to the desired azymuthal orientation has been acheived. In this manner then, second video conferencing apparatus 200 is able to capture the image of a newly identified principle speaker more quickly and with less mechanical activity and noise than is possible using first video conferencing apparatus 100.

Figure 10:
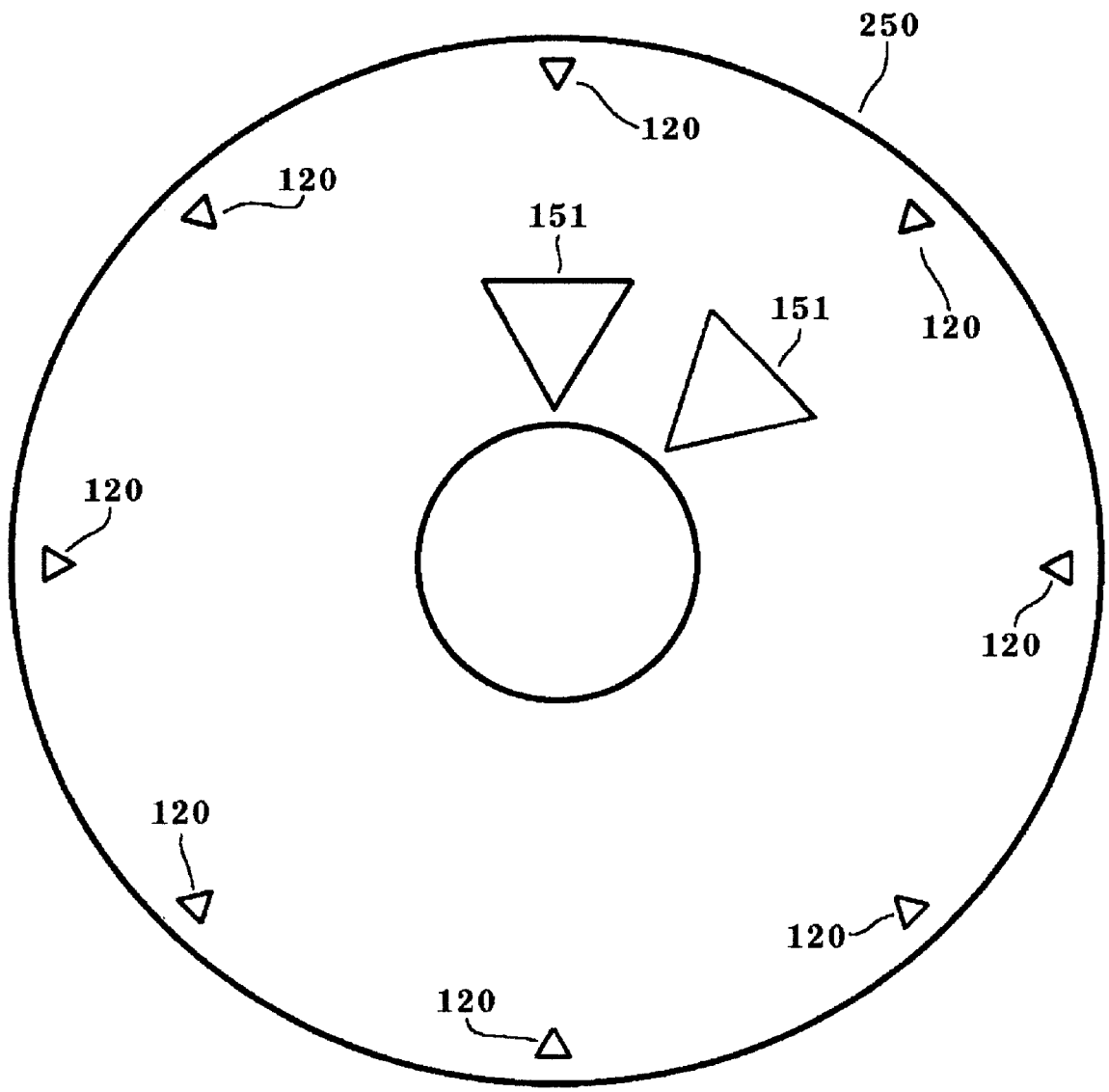
FIG. 10 shows a top plan view of the electronic circuit board of the second embodiment of the proposed group video conferencing apparatus.

The electronic circuitry for amplifying the audio signals from each audio microphone 120, for identifying a principle speaker, and for controlling and positioning platform motor 120 is located onto second electronic circuit board 250. FIG. 10 shows a top plan view of second electronic circuit board 250 wherein the radial array of audio microphones 120, and a pair of conductive pads 151 are indicated. As in the design of first electronic circuit board 150, conductive pads 151 are positioned onto the top surface of second electronic circuit board 250 so as to make contact with the lower tip of rotational position indicator 143 as it swipes across the top surface of second electronic circuit board 250. Unlike first video conferencing apparatus 100, second video conferencing apparatus 200 requires only two conductive pads 151 to control the electromechanical azimuthal positioning of circular platform 115. The reponsibility for capturing video images in the complete 360 azimuthal span in second video conferencing apparatus 200 is shared among the four video cameras 130, and each video camera 130 is assigned a coverage which spans a designated azimuthal range of 90 degrees. The radial array of eight audio microphones 120 provide the capability to accurately identify the azimuthal position of a principle speaker with an azimuthal accuracy of 45 degrees using simple audio signal processing techniques. Thus, when a particular video camera 130 is activated, an image that is within the specific 90 degree azimuthal span that is designated to the activated camera can be captured, and the image can then be centered into into the field of view of the activated camera to an azymuthal accuracy of 45 degrees through the electromechanical positioning capability that is provided by rotational positioning system 140 and the pair of conductive pads 151 . As with first video conferencing apparatus 100, the radial array of audio microphones 120 allows for an azimuthal positioning accuracy of 45 degrees if a simple non-interpolative algorithm is used to process the audio information that is captured by each audio microphone 120. If an interpolative algorithm were employed to process the audio information captured by each audio microphne 120 so as to thereby achieve an azimuthal positioning accuracy greater than 45 degrees, then an appropriately greater number of conductive pads 151 or video cameras 130 would be required to properly support this greater degree of accuracy.

The various other electronic components that are also located onto second electronic circuit board 250 are not shown by FIG. 10. As with first video conferencing apparatus 100, the detailed design of this electronic circuitry is arbitrary and there are numerous possible approaches for the detailed implementation of the necessary functions. However, as it is the object of this specification to teach the correct working of second video conferencing apparatus 200, a broad description of the necessary electronic functions is subsequently provided for completeness.

Figure 11:
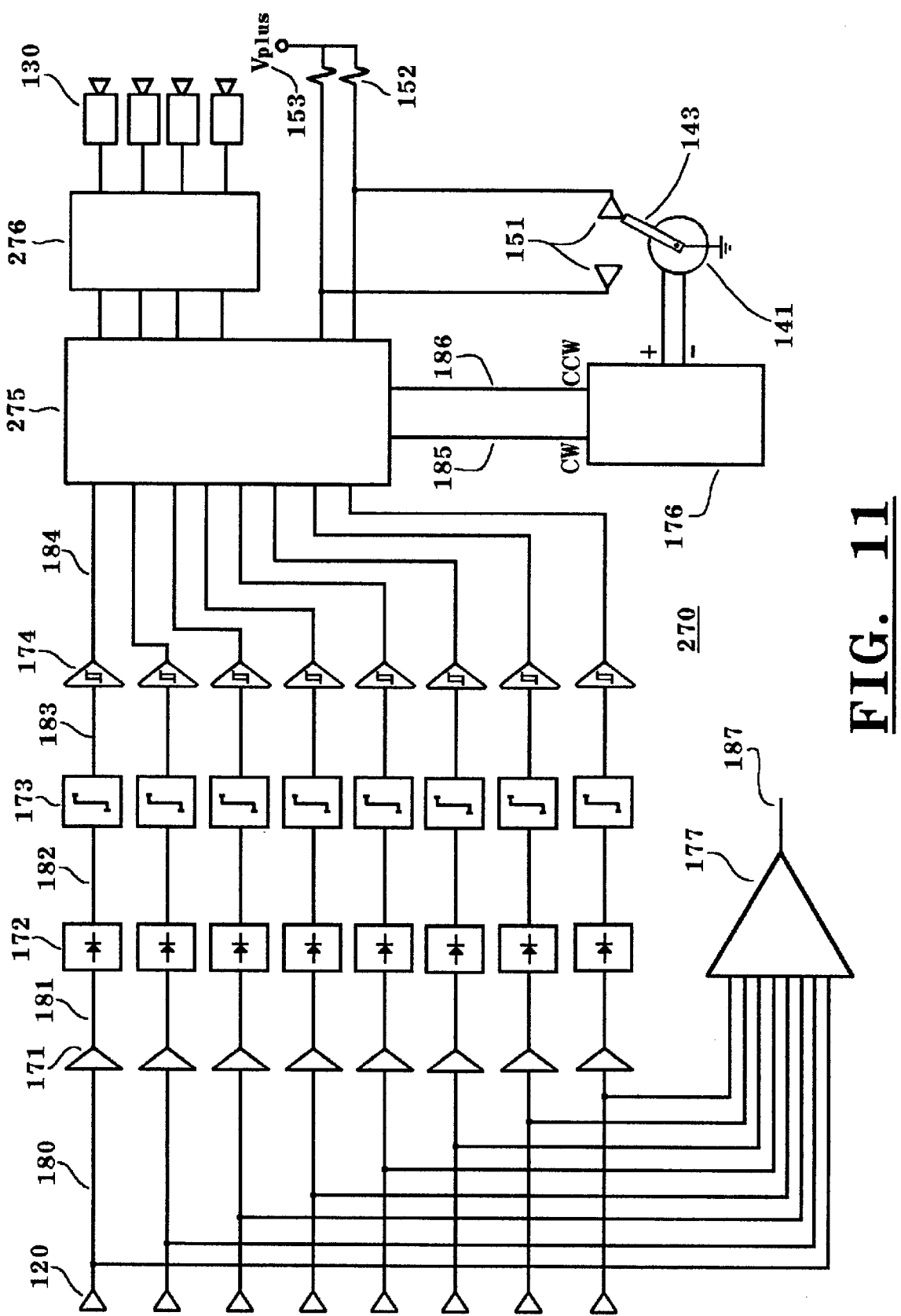
FIG. 11 shows a block diagram depiction of the electronic componentry of the second embodiment of the group video conferencing apparatus.

FIG. 11 shows a block diagram depiction of the second electronic circuitry 270 that implements the required electronic functions for second video conferencing apparatus 200. The purpose and functionings of each audio signal amplifier 171, each audio signal rectifier 172, each audio signal integrator 173, and each level comparator 174 is the same as the implementation for electronic circuit 170 and so will not be described again repetitiously for second electronic circuitry 270. The functioning of second control logic 275 however differs from the functioning of control logic 175 due to the added complexity of having to control the activation of one of four seperate video cameras 130. Like control logic 175, second control logic 275 will arbitrate the outputs of each level comparator 174 to determine which audio channel is currently active so as to determine the azimuthal position of the current principle speaker. Once second control logic 275 identifies the azimuthal position of the current speaker based on a pre-programmed algorithm, the appropriate video camera 130 is activated so as to capture the image of the principle speaker, and the video signal from the activated video camera is multiplexed onto second video wire assembly 235 by video multiplexer 276. Second control logic 275 also monitors the bias state of each conductive pad 151 and thus can assertain the current azimuthal position of circular platform 115. If the image of the principle speaker then needs to be centered within the field of view of the active video camera, second control logic 275 will activate either the rotate clockwise output 185 or the rotate counter clockwise output 186 as appropriate. Second control logic 275 will continue to reqeust a rotation of platform motor 141 until an electrical ground potential is sensed on the desired conductive pad 151 which correlates to the desired azimuthal positioning of circular platform 115.

Figure 12:
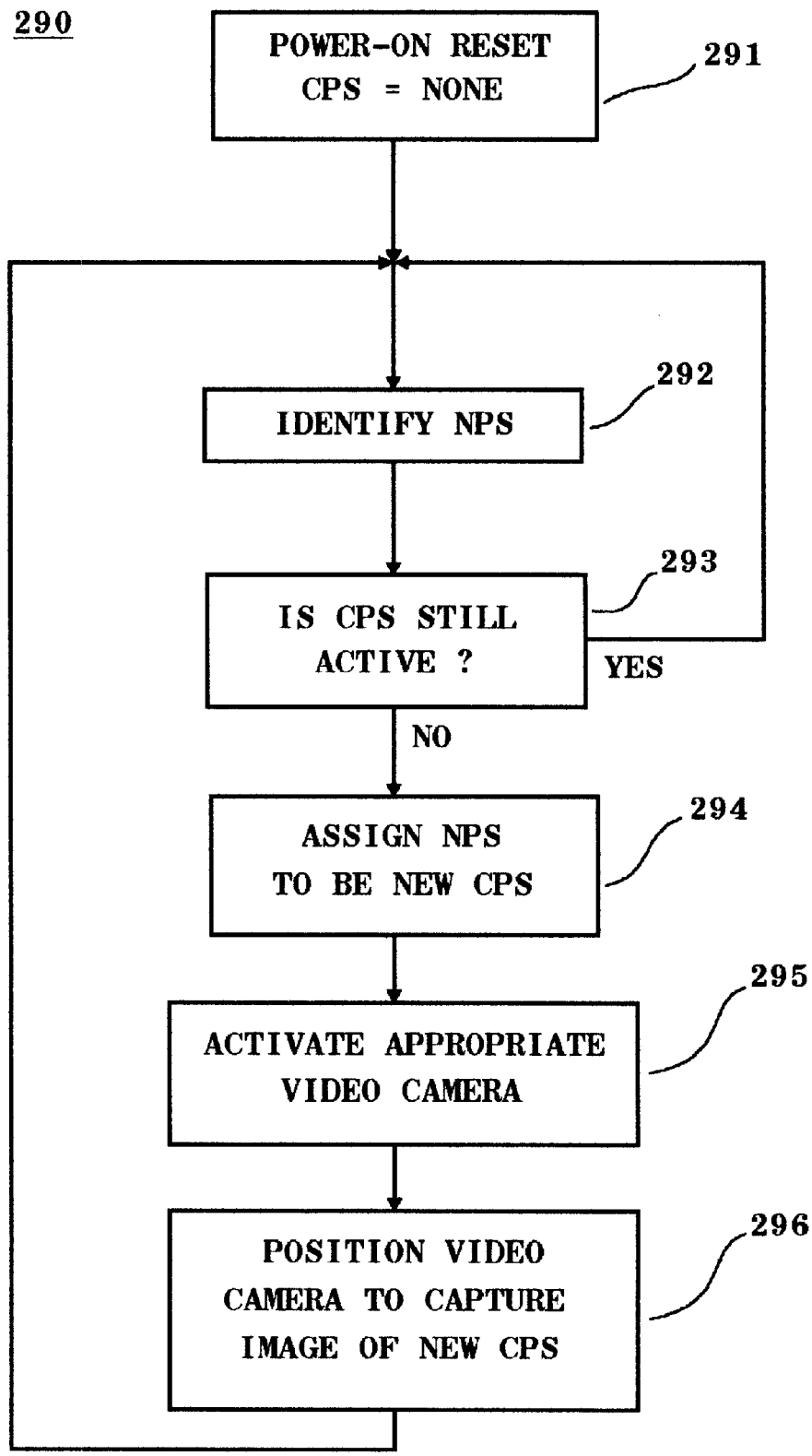
FIG. 12 shows the general algorithm by which a particular video camera of the second embodiment is activated and azimuthally positioned during the course of a group video conference.

The azimuthal positioning algorithm which is programmed into control logic 275 is shown by FIG. 12. Second positioning algorithm 290 is presented by FIG. 12 in a general block diagram form and is presented herein as a possible algorithm which may be implemented for controlling the functionings of second video conferencing apparatus 200. It should be apparent to those skilled in the art that differing algorithms may also be implemented, within the context of the components described by this specification, which would achieve similar results; and conversely it would also be possible to apply algorithm 290 to an implementation of components differing from the particular implementation of second video conferencing apparatus 200.

As FIG. 12 indicates, first control algorithm 290 begins with power-on reset step 291 wherein second video conferencing apparatus 200 is first powered on and activated. At this point in the operation of second video conferencing apparatus 200, a current principle speaker, CPS, is undetermined and is therefore unassigned. It is in new speaker detection step 292, that a new principle speaker, NPS, is identified. In second video conferencing apparatus 200 a detection of the NPS is made by way of a particular level comparator 174. When a particular digital signal 184 changes state from a logical '0' to a logical '1', this indicates that an audio signal characteristic to that of a principle speaker has been captured by the audio microphone 120 that is respective to the particular digital signal 184 that is at a logical '1'. Following new speaker detection step 292 is new speaker affirmation step 293, wherein second control algorithm 290 insures that the CPS is inactive prior to designating the NPS to be the new CPS. In second video conferencing apparatus 200, the CPS is determined to be inactive if the particular digital signal 184 respective to the particular audio microphone 120 which corresponds to the azimuthal location of the CPS has returned to a logical '0' level. If the CPS is indeed inactive, then second control algorithm 290 continues to new speaker assignment step 294 wherein the NPS is assigned to be the new CPS. Else first control algorithm returns again to new speaker detection step 292. Once a new CPS assignment has been made, second control algorithm 290 will then to camera activation step 295 wherein the appropriate video camera 130 is activated to capture the image of the newly designated CPS. Second control algorithm 290 then advances to a subsequent step, camera positioning step 296 wherein the azimuthal position of the activated video camera 130 is appropriately adjusted through the workings of camera positioning assembly 140.

Although the preceding description contains various specificities, these should not be construed as limiting the scope of the invention but as merely providing an example of the preferred embodiments of this invention. Many modifications, alterations and changes will become apparent to those skilled in the art to which this invention pertains. For example, it is a relatively simple procedure to integrate the functionality of duplex unit 15 into either first video conferencing appartus 100 or second video conferencing apparatus 200 so as to realize a self contained speaker phone and video conferencing apparatus. Similarly, it is possible to design alternate embodiments of the invention having an alternate number of audio microphones or a differing number of video cameras than are shown by the embodiments described by this specification. Also it is possible to implement alternate algorithms and associated componentry for the identification of the azymuthal position of the principle speaker. For example, a digital microprocessor based method could concievably be employed to digitally process a digitized representation of the audio information that is captured by each audio microphone 110, and so determine the azymuthal position of the principle speaker through fully digital means, as opposed to the combined analog and digital means that are described by this specification. Similarly, it is also possible to implement alternate methods for the azymuthal positioning of video camera 120 which differ from rotational positioning apparatus 140 that is described by this specification. For example, it is also possible using well known techniques to sense the azymuthal position of video camera 120 using optical azymuthal position sensors and their associated componentry, or using magnetic azymuthal position sensors and their associated componentry in lieu of the methods which have been described by this specification.

Therefore as many alterations, modifications and changes will become apparent to those skilled in the art to which this invention pertains, the scope of this invention should be determined by the appended claims and their legal equivalents, rather than by the embodiment described herein.

The inventors claim:

1. An apparatus for the purpose of determining the azimuthal position of a speaker from within a group of a first number of participants, said participants being azimuthally positioned about said apparatus, said apparatus comprising:

a means for the determination of the azimuthal position of said speaker from within said group of participants, wherein said determination of said azimuthal position of said speaker is realized through the electronic processing of audio signals generated by said group of participants, wherein said means for said determination of the azimuthal position of said speaker is comprised of a generally circular array of a second number of audio microphones, wherein said second number of said audio microphones is not correlated to said first number of said participants, said audio microphones being affixed to a common base element, said audio microphones being unattached from said participants, said audio microphones being located so as to capture said audio signals generated by said participants, wherein the low level electronic signal produced by each of said audio microphones is electronically amplified to produce a multiple number of corresponding first electronic signals, wherein the absolute value of each said first electronic signal is averaged over time through electronic means to produce a corresponding number of second electronic signals, wherein the magnitude of each said second electronic signal is converted to a multiple number of discrete digital electronic signals, wherein said multiple number of discrete digital electronic signals are processed by electronic computational logic, wherein said electronic computational logic computes the azimuthal position of said speaker through a pre-programmed algorithm.

2. A group video conferencing apparatus for the purpose of facilitating a group video conference involving a group of a first number of participants, said participants being azimuthally positioned about said apparatus, said apparatus comprising:

a means for the determination of the azimuthal position of said speaker from within said group of participants, wherein said determination of said azimuthal position of said speaker is realized through the electronic processing of audio signals generated by said group of participants, wherein said means for said determination of the azimuthal position of said speaker is comprised of a generally circular array of a second number of audio microphones, wherein said second number of said audio microphones is not correlated to said first number of said participants, said audio microphones being affixed to a common base element, said audio microphones being unattached from said participants, said audio microphones being located so as to capture said audio signals generated by said participants, wherein the low level electronic signal produced by each of said audio microphones is electronically amplified to produce a multiple number of corresponding first electronic signals, wherein the absolute value of each said first electronic signal is averaged over time through electronic means to produce a corresponding number of second electronic signals, wherein the magnitude of each said second electronic signal is converted to a multiple number of discrete digital electronic signals, wherein said multiple number of discrete digital electronic signals are processed by electronic computational logic, wherein said electronic computational logic computes the azimuthal position of said speaker through a pre-programmed algorithm, a means to effect the azimuthal positioning of at least a single video camera, wherein said azimuthal positioning of said video camera is correlated to said azimuthal position of said speaker, wherein said azimuthal position of said speaker is determined by said electronic processing of said electronic signals generated by said group of participants.

3. The invention of claim 2 wherein said azimuthal positioning of said video camera is effected through electromechanical means, said electromechanical means comprising a motor means to effect said azimuthal positioning of said video camera, said electromechanical means also comprising electronic circuitry, said electronic circuitry acting to effect the actuation of said motor means.

4. The invention of claim 2 also comprising a monitoring means for the monitoring of said azimuthal positioning of said video camera, said monitoring means comprising an electrically conductive element wherein the azimuthal position of said electrically conductive element is in correlation with the azimuthal position of said video camera, said monitoring means comprising a group of electrically conductive pads wherein said electrically conductive pads are rigidly located into a generally circular arrangement, said monitoring means comprising electronic monitoring circuitry, said electrically conductive element being capable of contacting a particular said electrically conductive pad once the azimuthal position of said electrically conductive element is coincident with the azimuthal location of a particular said electrically conductive pad, said electrically conductive element being biased to a first electric potential, said electrically conductive pads being biased to a second electric potential, said electrically conductive element being capable of impressing said first electric potential onto a contacted said electrically conductive pad, said electronic monitoring circuitry being capable of sensing the electric potential of each said electrically conductive pad, said electronic monitoring circuitry ascertaining the azimuthal position of said video camera by sensing the electric potential of each said electrically conductive pad.

5. The invention of claim 2 wherein said generally circular array of said audio microphones and wherein said video camera are both affixed to a common structure for the purposes of comprising a constituent apparatus.

6. The invention of claim 2 wherein said generally circular array of said audio microphones and wherein said video camera are both affixed to a common structure for the purposes of comprising a constituent apparatus, wherein said video camera is centrally located to said generally circular array of said audio microphones.

7. The invention of claim 2 wherein said video conferencing apparatus also comprises an audio speaker means, said audio speaker means capable of converting an electronic signal into an audible audio signal, said audio signal being appropriate for the purposes of implementing a speakerphone.

8. A group video conferencing apparatus for the purpose of facilitating a group video conference involving a group of a first number of participants, said participants being azimuthally positioned about said apparatus, said apparatus comprising:

a means for the determination of the azimuthal position of said speaker from within said group of participants, wherein said determination of said azimuthal position of said speaker is realized through the electronic processing of audio signals generated by said group of participants, wherein said means for said determination of the azimuthal position of said speaker is comprised of a generally circular array of a second number of audio microphones, wherein said second number of said audio microphones is not correlated to said first number of said participants, said audio microphones being affixed to a common base element, said audio microphones being unattached from said participants, said audio microphones being located so as to capture said audio signals generated by said participants, wherein the low level electronic signal produced by each of said audio microphones is electronically amplified to produce a multiple number of corresponding first electronic signals, wherein the absolute value of each said first electronic signal is averaged over time through electronic means to produce a corresponding number of second electronic signals, wherein the magnitude of each said second electronic signal is converted to a multiple number of discrete digital electronic signals, wherein said multiple number of discrete digital electronic signals are processed by electronic computational logic, wherein said electronic computational logic computes the azimuthal position of said speaker through a pre-programmed algorithm, a means to activate a video image captured by at least a single video camera, wherein the azimuthal field of view of the activated said video camera is correlated to said azimuthal position of said speaker, wherein said azimuthal position of said speaker is determined by said electronic processing of said audio signals generated by said group of participants.

9. The invention of claim 8 wherein said generally circular array of said audio microphones and wherein said video camera are both affixed to a common structure for the purposes of comprising a constituent apparatus.

10. The invention of claim 8 wherein said generally circular array of said audio microphones and wherein said video camera are both affixed to a common structure for the purposes of comprising a constituent apparatus, wherein said video camera is centrally located to said generally circular array of said audio microphones.

11. The invention of claim 8 wherein said video conferencing apparatus also comprises an audio speaker means, said audio speaker means capable of converting an electronic signal into an audible audio signal, said audio signal being appropriate for the purposes of implementing a speakerphone.

12. A group video conferencing apparatus for the purpose of facilitating a group video conference involving a group of a first number of participants, said participants being azimuthally positioned about said apparatus, said apparatus comprising:

a means for the determination of the azimuthal position of said speaker from within said group of participants, wherein said determination of said azimuthal position of said speaker is realized through the electronic processing of audio signals generated by said group of participants, wherein said means for said determination of the azimuthal position of said speaker is comprised of a generally circular array of a second number of audio microphones, wherein said second number of said audio microphones is not correlated to said first number of said participants, said audio microphones being affixed to a common base element, said audio microphones being unattached from said participants, said audio microphones being located so as to capture said audio signals generated by said participants, wherein the low level electronic signal produced by each of said audio microphones is processed by electronic circuitry so as to determine said azimuthal position of said speaker, said electronic circuitry effecting said determination of said azimuthal position of said speaker, a means to effect the azimuthal positioning of at least a single video camera, wherein said azimuthal positioning of said video camera is correlated to said azimuthal position of said speaker, wherein said azimuthal position of said speaker is determined by said electronic processing of said audio signals generated by said group of participants, a means for the monitoring of said azimuthal positioning of said video camera, said monitoring means comprising an electrically conductive element wherein the azimuthal position of said electrically conductive element is in correlation with the azimuthal positioning of said video camera, said monitoring means comprising a group of electrically conductive pads wherein said electrically conductive pads are rigidly located into a generally circular arrangement, said monitoring means comprising electronic monitoring circuitry, said electrically conductive element being capable of contacting a particular said electrically conductive pad once the azimuthal position of said electrically conductive element is coincident with the azimuthal location of a particular said electrically conductive pad, said electrically conductive element being biased to a first electric potential, said electrically conductive pads being biased to a second electric potential, said electrically conductive element being capable of impressing said first electric potential onto a contacted said electrically conductive pad, said electronic monitoring circuitry being capable of sensing the electric potential of each said electrically conductive pad, said electronic monitoring circuitry ascertaining the azimuthal position of said video camera by sensing the electric potential of each said electrically conductive pad.

\* \* \* \* \*